(12) United States Patent
Burkett

(10) Patent No.: US 6,688,628 B2
(45) Date of Patent: Feb. 10, 2004

(54) MOTORCYCLE BRACKET

(76) Inventor: Robert C. Burkett, 13524 Dornoch Dr., Orlando, FL (US) 32828

( * ) Notice: Subject to any disclaimer, the term of this patent is extended or adjusted under 35 U.S.C. 154(b) by 0 days.

(21) Appl. No.: 09/981,003

(22) Filed: Oct. 17, 2001

(65) Prior Publication Data

US 2003/0071438 A1 Apr. 17, 2003

(51) Int. Cl.⁷ .............................. B62H 1/00; G05G 1/18
(52) U.S. Cl. ........................................ 280/291; 74/564
(58) Field of Search ................. 280/291, 163; 74/564

(56) References Cited

U.S. PATENT DOCUMENTS

| | | | | |
|---|---|---|---|---|
| 1,261,442 A | * | 4/1918 | Rigby | 280/291 |
| 2,759,370 A | * | 8/1956 | Frates | 74/562 |
| 4,174,852 A | * | 11/1979 | Panzica et al. | 280/291 |
| D270,823 S | * | 10/1983 | Mounts | D12/114 |
| D283,413 S | | 4/1986 | Preisler et al. | |
| 4,754,946 A | * | 7/1988 | Constantin | 248/503.1 |
| 4,935,638 A | * | 6/1990 | Straka | 280/164.1 |
| 5,090,715 A | | 2/1992 | Nakajima et al. | |
| 5,720,359 A | | 2/1998 | Attenello | |
| 5,779,254 A | | 7/1998 | James et al. | |
| 5,961,138 A | | 10/1999 | Roark et al. | |
| 6,073,719 A | | 6/2000 | Ohmika et al. | |
| 6,152,474 A | | 11/2000 | Rupert | |
| 6,173,983 B1 | * | 1/2001 | Moore | 280/291 |

FOREIGN PATENT DOCUMENTS

| EP | 0 900 721 A2 | | 3/1999 |
|---|---|---|---|
| JP | 11-227659 A | * | 8/1999 |

* cited by examiner

Primary Examiner—Kevin Hurley
(74) Attorney, Agent, or Firm—Colin P. Abrahams

(57) ABSTRACT

A bracket for mounting a motorcycle foot platform on a motorcycle frame comprises a mounting body having a fastening mechanism for fastening the bracket to a frame of the motorcycle, and a connecting portion. A support arm supports the foot platform, and has a central portion which connects to the connecting portion of the mounting body. The support arm has a front arm portion extending substantially forwardly from the central portion and has an end remote from the central portion and an attachment member near the end for receiving and attaching to the foot platform. The support arm also has a back arm portion extending substantially rearwardly from the central portion and has an end remote from the central portion and an attachment member near the end for receiving and attaching to the foot platform.

16 Claims, 3 Drawing Sheets

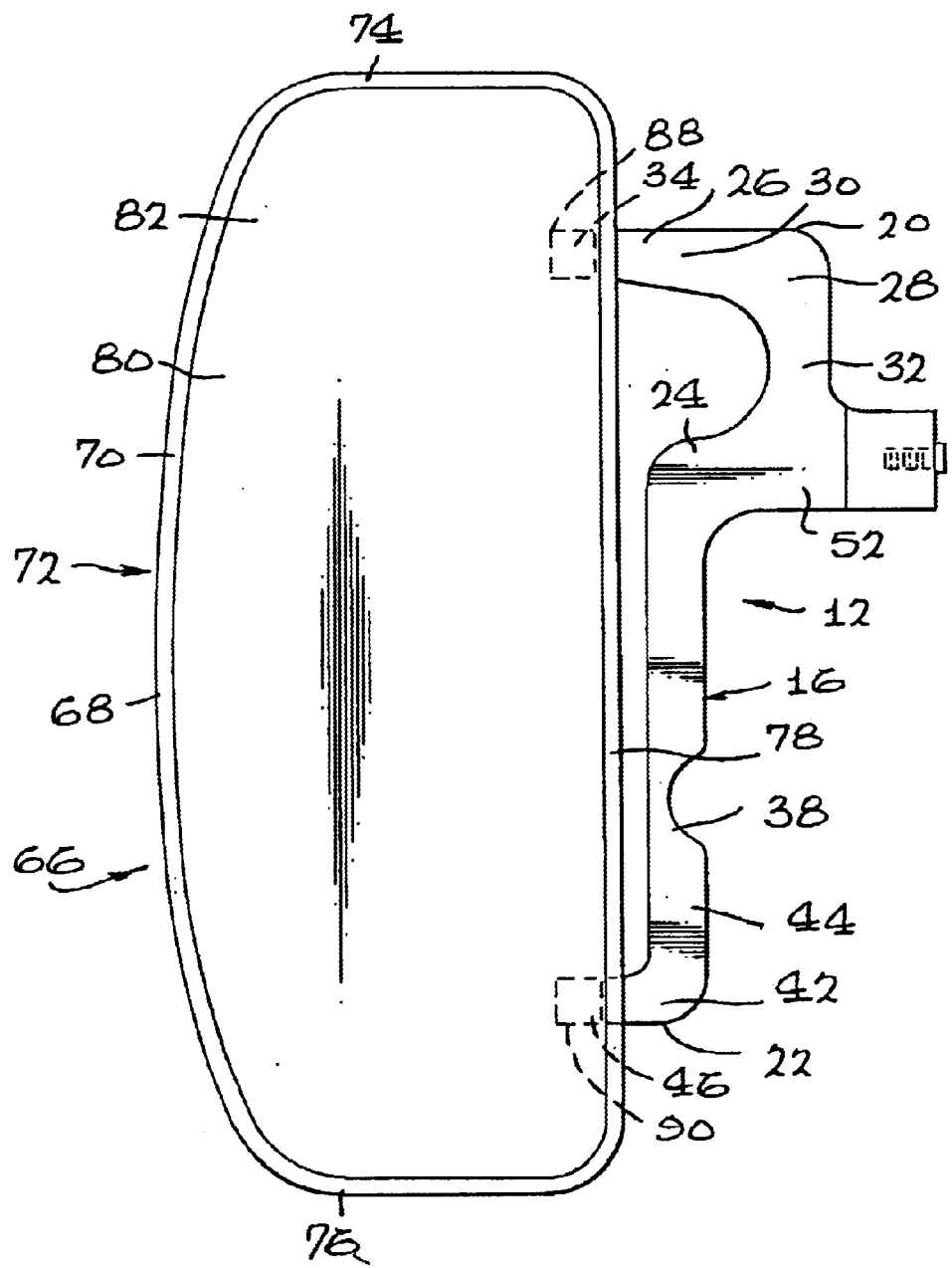

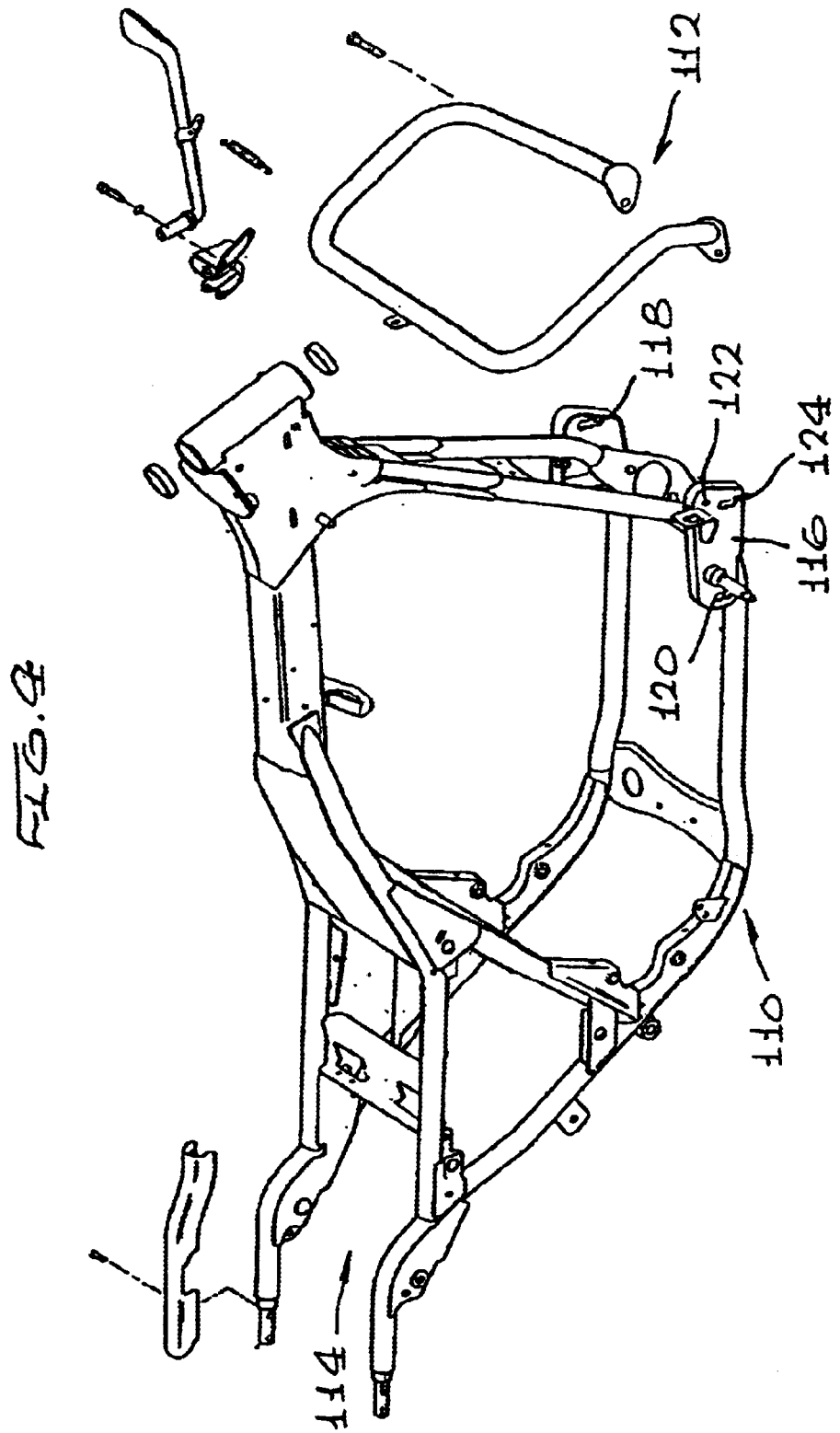

MOTORCYCLE BRACKET

FIELD AND BACKGROUND OF THE INVENTION

This invention relates to foot boards or foot platforms for motorcycles, as well as foot board or foot platform brackets for supporting such foot boards. In one aspect, the invention provides a fixed position bracket that is capable of changing the fixed position of the original footboard to a more downward and forward fixed position. The invention also relates to such foot boards and brackets constructed so as to enable the foot board to be shifted, preferably in a relatively permanent manner, in both a vertical and a horizontal position, including a forward and/or downward position, to provide additional or customized leg room for riders, especially taller riders.

One of the features of all motorcycles is a peg, bracket or other form of support upon which the rider's foot is received. In many motorcycles, especially of the smaller variety, such a foot support may be nothing more than an outwardly projecting peg, extending outwardly from a frame of the motorcycle, and, typically, the rider would rest the arched or middle portion of the foot over this peg. However, many of the larger or better-equipped motorcycles provide not just a peg, but what is commonly called a foot board or a foot platform, which is in the form of a large, substantially horizontal platform, sized and located for receipt of the entire foot of the rider. Such foot boards offer substantially more comfort and flexibility to the rider, enabling improved support as well as some shifting of the foot during riding, which is an important comfort and safety advantage.

In some typical footboard applications, there are provided two or more brackets, situated forwardly and rearwardly with respect to the frame of the bike, each of which engages a footboard which is secured thereto. The foot board will typically have, for additional comfort, a pad thereon, offering additional comfort to the rider and providing the foot board with a more appealing look overall.

Prior art foot boards may have multiple components, each foot board having a front and rear bracket kit, each kit including a custom-shaped bracket itself, with its accompanying screws, bolts, lock washers and accessories. Such foot boards often lack flexibility in terms of location, and it is cumbersome and sometimes expensive to custom-locate the foot board according to the size and preferences of the rider.

Various types of footrests, floor boards and similar types of accessories are shown in the prior art. For example, U.S. Pat. No. 5,779,254 allows a rider to vary his or her foot position by providing a secondary foot rest assembly. Two positions are therefore provided, including the standard pedal-type footrest, as well as an auxiliary peg-type footrest, which can be folded away.

U.S. Pat. No. 6,073,719 describes generally the body structure of a low-floor motorcycle, particularly a scooter, and the relative positioning of the front frame, rear frame, engine mount, foot board and other components thereof. U.S. Pat. No. 5,720,359 describes an adjustable floorboard enabling the rider to make rapid and easy adjustments without the need to unbolt and reinstall existing floorboards.

U.S. Pat. No. 5,961,138 is for a motorcycle footboard trim piece, including a vibration dampening mount, and a decorative element and trim piece. U.S. Pat. No. 6,152,474 teaches an adjustable motorcycle footrest, including a horizontal rod and a vertical rod attached to a mounting plate. Operation of an adjustment pin allows variation in position of the footrest. U.S. Pat. No. 5,090,715 teaches a movable footrest for motorcycles, capable of upward and downward displacement so as to enable an optimum position depending on the circumstances.

Design Patent Des. 283,413 shows a pair of motorcycle driver's footboards, including a bracket having two or more points of connection with the frame of the motorcycle. European Patent Application No. 0 900 721 8A2 describes a footpeg (as opposed to a footboard) support, including an articulated structure where two hinged-together elements can be loosened and tightened, making it possible to alter the height of the footboard from the surface on which the vehicle is located.

SUMMARY OF THE INVENTION

According to one aspect of the invention, there is provided a bracket for mounting a motorcycle foot platform, the bracket comprising: a mounting body having a fastening mechanism for fastening the bracket to a frame of the motorcycle, and a connecting portion; and a support arm for supporting the foot platform, the support arm having a central portion which connects to the connecting portion of the mounting body, a front arm portion extending substantially forwardly from the central portion and having an end remote from the central portion and an attachment member near the end for receiving and attaching to the foot platform, and a back arm portion extending substantially rearwardly from the central portion and having an end remote from the central portion and an attachment member near the end for receiving and attaching to the foot platform. The central portion of the support arm may be integral with the connecting portion of the mounting body.

Preferably, the fastening mechanism comprises a flat face on the mounting body, the flat face having a projection thereon which is received within an aperture of the frame of the motorcycle, the fastening mechanism further comprising a threaded bore and a bolt for receipt within the threaded bore, the bolt passing through a further aperture in the frame of the motorcycle to secure the mounting body to the frame.

Preferably, the front arm portion comprises a first component which extends forwardly from the central portion of the support arm, and a second component substantially transverse to the first component, the attachment member being located on the second component. Likewise, the back arm portion may comprise a first component which extends rearwardly from the central portion of the support arm, and a second component substantially transverse to the first component, the attachment member being located on the second component.

The front arm portion may have an axis and the back arm portion has an axis, and the axes of the front arm portion and back arm portion do not overlap. Preferably, the bracket, when mounted on the frame of the motorcycle, the axis of the front arm portion is closer to the frame of the motorcycle than the axis of the back arm portion.

In a preferred form, the dimensions of the mounting body and support arm are selected so as to locate the foot platform relative to the frame of the motorcycle in a horizontal and vertical position chosen for the comfort of the rider. The invention may provide a new set of brackets for any given motorcycle so that the original brackets can be removed, the new brackets can be installed, and the original footboards are re-installed on the new bracket. The new brackets provide a new fixed position which may be more forward and downward than that provided by the original brackets, thus providing more leg room for a taller rider. In one embodiment, the front arm portion is longer and the back arm portion is shorter to achieve a horizontal position of the foot platform relative to the motorcycle which is in a more forward position. In another embodiment, the front arm portion is shorter and the back arm portion is longer to achieve a horizontal position of the foot platform relative to the motorcycle which is in a more rearward position.

Preferably, the shape of the mounting body, and the connecting portion thereon, is selected so as to achieve a preferred vertical position of the foot platform. In one form, the mounting body extends a distance downwardly from the fastening mechanism to provide a lower vertical position of the foot platform relative to the frame of the motorcycle. In another form, the mounting body extends a distance upwardly from the fastening mechanism to provide a higher vertical position of the foot platform relative to the frame of the motorcycle.

According to another aspect of the invention, there is provided a footboard assembly for use with a motorcycle, the footboard assembly comprising: a bracket comprising a mounting body having a fastening mechanism for fastening the bracket to a frame on/of the motorcycle, and a connecting portion, a support arm for supporting the foot platform, the support arm having a central portion which connects to the connecting portion of the mounting body, a front arm portion extending substantially forwardly from the central portion and having an end remote from the central portion and an attachment member near the end for receiving and attaching to the foot platform, and a back arm portion extending rearwardly from the central portion and having an end remote from the central portion and an attachment member near the end for receiving and attaching to the foot platform; and a foot platform mounted on the bracket at the attachment members on the front arm portion and the back arm portion respectively. Preferably, the foot platform includes a pair of attachment structures to coordinate with and connect to each of the attachment members on the front arm portion and rear arm portion respectively.

In yet a further aspect of the invention, there is provided a method of securing a footboard assembly having a bracket and a foot platform to a frame of a motorcycle so as to provide selective vertical and horizontal orientation of the foot board so that the vertical and/or horizontal orientation of the foot platform can be adjusted according to the comfort of a rider, the method comprising: providing a bracket having a mounting body with a fastening mechanism thereon for fastening the bracket to a frame, and a connecting portion; and connecting a support arm to the connecting portion of the mounting body, the support arm having a central portion, a front arm portion, and a back arm portion respectively, wherein a bracket is dimensioned so that the length of the connecting portion, front arm portion and back arm portion is selected so that the foot platform will be oriented in a preferred vertical and horizontal position.

BRIEF DESCRIPTION OF THE DRAWINGS

FIG. 2 is a top view of the left bracket and footboard of the invention;

FIG. 4 is an exploded view of a motorcycle frame and some of its components.

DETAILED DESCRIPTION OF THE INVENTION

The invention is for a foot board bracket, as well as a bracket in association with a footboard, the dimensions of which can be varied according to need, and which can easily fit onto a frame of an existing motorcycle to replace the existing foot board or foot platform. The bracket and foot board of the invention enable a rider to select a bracket and an associated foot board which has appropriate dimensions so as to provide a custom location, in a vertical and a horizontal plane, of the foot board relative to the motorcycle, and particularly the seat thereof, so that the rider will enjoy maximum comfort by the customized distance and orientation of the foot board on the frame.

In one aspect, the present invention contemplates the removal of the existing foot board, and all associated accessories for fastening it to the frame of a motorcycle, and replacing the various accessories with a single bracket connected at one point, and upon which is easily connected a board, pad and such additional hardware as may be desirable according to the tastes of the rider.

Figure 1:
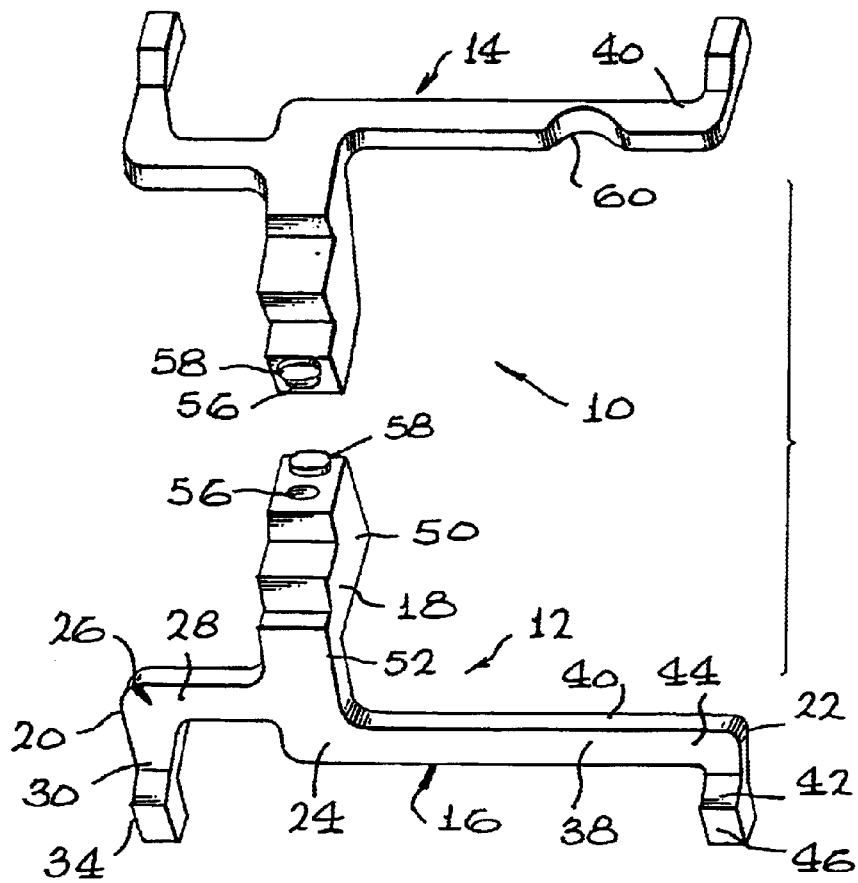
FIG. 1 is a top perspective view of a pair of left and right brackets for respectively supporting a footboard.

Reference is now made to FIG. 1 of the drawings, which shows a pair of brackets 10 according to one embodiment of the invention. With reference to FIG. 1, there is illustrated a bracket pair 10 comprising a left side bracket 12 and a right side bracket 14. It will be noted that the left and right side brackets 12 and 14 respectively are potentially mirror images of each other, and have substantially the same structure and components. Therefore, only the left side bracket 12 will be described in detail in this specification, it being understood that the right side bracket 14 is substantially a mirror image, unless otherwise specifically indicated.

The left side bracket 12 comprises a support section 16 and a connector section 18. The support section 16 is intended to carry the foot board, pad and other components, while the connector section 18 is intended to fasten to the frame of the motorcycle. The left side bracket 12 has a front end 20 and a rear end 22. The support section 16 comprises a central portion 24, having a forwardly extending front arm portion 26, the front arm portion 26 having a parallel piece 28, and a transverse piece 30 substantially at right angles thereto. The front end 20 has an upper surface 32, and on the upper surface 32 of the transverse piece 30 there is formed a front attachment surface 34 adapted to attach to the foot board, as will be described below.

The support section 16 further comprises a rear arm portion 38 having a parallel piece 40 and a transverse piece 42 at substantially right angles thereto. The parallel piece 40 has an upper surface 44, upon which is formed a rear attachment surface 46 adapted to connect to a foot board, as will also be described hereunder.

It will be noted that the parallel piece 28 of the front arm portion 26 and the parallel piece 40 of the rear arm portion 38 are not linear, but are axially displaced from each other. In use, the parallel piece 28 will be closer to the frame of the motorcycle, while the parallel piece 40 will be slightly removed therefrom. This configuration takes into account existing elements and structure on conventional motorcycles, accommodating their existence. The parallel piece 40 is constructed so as to jut out farther than parallel piece 28 so that it will clear the transmission housing on the motorcycle.

The connector section 18 of the left side bracket 12 comprises a block portion 50 and a projecting portion 52, the projecting portion 52 connecting to the central portion 24 of the support section 16. The block portion 50 has an abutment face 54. The abutment face 54 has therein a threaded bore 56 adapted to receive a bolt and by means of which the left side bracket 12 connects to the frame of the motorcycle, as will be described. The abutment face 54 also has extending outwardly therefrom a rounded stud 58. The rounded stud 58 engages in a corresponding recess or aperture of the frame of the motorcycle, as will be described. In the left 20 side bracket 12, the threaded bore 56 is above the stud 58, whereas, in the right side bracket 14, the threaded bore 56 is below the stud 58.

In FIG. 1 of the drawings, the parallel piece 40 of the right side bracket 14 includes a recess portion 60, which is designed to clear a piece of the brake lever on the right side of the motorcycle. In other embodiments of the invention, the left side bracket 12 may have a similar type recess portion in the rear portion 38.

Both the front attachment surface 34 and the rear attachment surface 46 are provided with appropriately located bores and surfaces to facilitate a secure connection to the foot board. It will be appreciated that many different forms of attachment, as well as their precise construction, fall within the scope of the invention, and the invention is not limited to any one configuration.

Reference is now made to FIG. 2 of the drawings which shows a left side bracket 12 of the invention, in top view, connected to a foot board assembly 66. The foot board assembly 66 comprises a foot board 68, including a peripheral rim 70, the foot board 68 being of generally rectangular shape, but with the outer edge 72 having a slightly arcuate or curved contour. The foot board 68 further comprises a front edge 74, a rear edge 76, as well as an inner edge 78. The peripheral rim 70 defines a support space 80 adapted to receive the foot of the rider. Within, or on, the support space 80, there is provided a pad 82 which may operate as a cushion for the comfort of the rider.

The foot board assembly 66 further comprises a front attachment member 88 and a rear attachment member 90, both of which are positioned on the footboard 68 so as to receive and connect to the front attachment surface 34 and the rear attachment surface 46 respectively. The front and rear attachment members 88 and 90 may be attached to the front portion 26 and rear portion 38 of the support section 16 by any convenient means, such as by bolting, screws or the like. Further, or in the alternative, the foot board 68 may comprise attachment housings on the underside thereof which receive and connect to the bracket 12.

The underside of the footboard may have a receiving place for the attachment members 88 and 90 shown in FIG. 2. These attachment members 88 and 90 may have holes drilled in them horizontally. A bolt would fit through the front of part of this receiving area, pass through the front of member 88, exit out the back of member 88, and through the rear end of the receiving area surrounding member 88. A nut would secure the bolt to member 88, thus securing the footboard to the bracket. The same process would apply with respect to attachment member 90.

Figure 3:
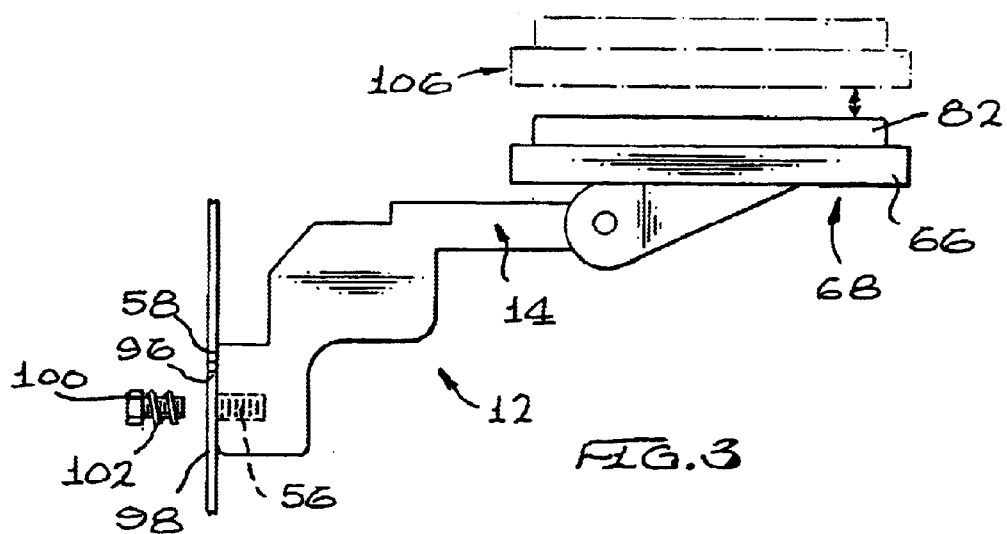
FIG. 3 is a front view of the left bracket and footboard of the invention.

With reference to FIG. 3 of the drawings, there is shown a front view of the left bracket 12, or a back view of the right bracket 14, both of these views being essentially the same. FIG. 3 shows, in phantom lines, the relevant portion of the frame 94 of the motorcycle to which the left side bracket 12 attaches. The frame 94 thus comprises an upper aperture 96 and a lower aperture 98. In use, the stud 58 is located in the upper aperture 96, and the bracket 12 is then adjusted or rotated about the stud 58 until such time as the threaded bore 56 registers with the lower aperture 98. In this position, a bolt 100, with accompanying lock washers 102, is inserted into the threaded bore 56 and tightened so as to securely fasten the bracket 12, and attached footboard assembly 66, to the frame 94 of the motorcycle.

One advantage of the present invention comprises the stud 58 and threaded bore 56 combination, which facilitate an accurate and simple connection of the brackets 12 and 14 to the motorcycle frame 94 using only a single bolt 100. With the stud 58 in place within the upper aperture 96, and the bolt 100 engaged within the threaded bore 56, there will be no pivoting or movement of the bracket 12 relative to the frame 94 in view of these two independent connections.

In FIG. 3, the foot board assembly 68 is shown, as well as, in phantom lines, the original footboard 106 and its position, which is clearly shown in a raised elevation relative to the foot board assembly 68. The original foot board 106 may also be less forwardly oriented than that of the substituted foot board assembly 66 of the invention.

The invention therefore provides an effective and strong bracket and foot board assembly which can replace the original, and which can be very easily connected to the frame, wherein the dimensions of the brackets 12 and 14 will directly determine the position of the footboard 68. Thus, a rider can select a bracket the size and dimensions of which will best suit his height and comfort requirements by placing the foot board 68 in the most convenient position for that rider. In another form, the invention offers a choice of brackets that would permanently move the fixed position of the original floorboard to a new and more comfortable fixed position. Users would be able to select from a number of choices of fixed-position brackets.

Reference is now made to FIG. 4 of the drawings, which shows a typical motorcycle frame, generally indicated by the reference numeral 110. The frame 110 has a forward end 112, and a rearward end 114. The frame 110 further comprises a right attachment and a mounting plate 116 for the bracket and footboard, and a left attachment and mounting plate 118, this for the left bracket and foot board. In a typical application, a floor board will rest on two completely separate brackets, with all their accessories. There will be a rear bracket assembly which connects through apertures 120, and a forward bracket assembly with all the accessories which connects to the apertures 122 and 124. The existing brackets and accessories for assembly may require a significant amount of work and adjustment to install. Further, providing such brackets and accessories to vary the ultimate position of the floorboard would be cumbersome and very difficult to make and instal.

The present invention provides for the left and right side brackets 12 and 14 respectively which easily install to the existing left and right attachment and mounting plates 118 and 116 respectively. The front aperture set 122 and 124 are used, with the stud 58 being located in one of the apertures, such as aperture 122, and with the bolt securing the bracket to the attachment and mounting frame 116, through the other aperture, such as aperture 124.

The bracket and floor or foot board of the invention may permit variations in the location of the floor board relative to the frame of the motorcycle in various ways. First, the size and configuration of the bracket 12 or 14 itself may be varied so that the front and rear attachment surfaces are either forwardly located or relatively rearwardly located. This is achieved by selecting, for a particular bracket, the length of the front arm portion 26 and back arm portion 38 to be longer or shorter in a given configuration so that the foot board would, when mounted on such bracket, be forwardly or rearwardly located. For example, a longer front arm portion 26 and a shorter back arm portion would shift the foot board forward. Conversely, a shorter front arm portion 26 and a longer back arm portion 34 would shift the foot board backward. This would facilitate forward and rearward customization of the position.

Further, the position of the support section 16 relative to the connector section 18 can also be varied, making the support section 16 either higher or lower, depending upon both its point of connection to the connector section 18 as well as its length. This variation in construction would permit the raising or lowering of the floor or foot board accordingly.

It may also be possible to vary the position of the foot board assembly by having different connector points, even multiple connector points, for the support section 16 on the foot board assembly 66. Thus, the foot board 68 itself can be moved forward or backward relative to the support section 16, providing yet another means for adjusting the position of the footboard 68 to suit the comfort of the user.

The invention is not limited to the precise details described herein, and variations are possible.

What is claimed is:

1. A method of securing a footboard assembly having a bracket and a foot platform to a frame of a motorcycle so as to provide selective vertical and horizontal orientation of the foot board so that the vertical and/or horizontal orientation of the foot platform can be adjusted according to the comfort of a rider, the method comprising:

providing a bracket having a mounting body with a fastening mechanism thereon for fastening the bracket to a frame, and a connecting portion, the fastening mechanism comprising a flat face on the mounting body and a threaded here and a bolt received within the bore, the flat face having a projection thereon;

inserting the projection within an aperture of the frame of the motorcycle;

inserting the bolt through a further aperture in the frame of the motorcycle to secure the mounting body to the frame;

connecting a support arm to the connecting portion of the mounting body, the support arm having a central portion, a front arm portion, and a back arm portion is respectively, wherein a bracket is dimensioned so that the length of the connecting portion, front arm portion and back arm portion is selected so that the foot platform will be oriented in a preferred vertical and horizontal position.

2. A bracket for mounting a motorcycle foot platform, the bracket comprising:

a mounting body having a fastening mechanism for fastening the bracket to a frame of the motorcycle, and a connecting portion, the fastening mechanism comprising a substantially flat face on the mounting body, the flat face having a projection thereon which is received within an aperture of the frame of the motorcycle, the fastening mechanism further comprising a threaded bore and a bolt for receipt within the threaded bore, the bolt passing through a further aperture in the frame of the motorcycle to secure the mounting body to the frame; and a support arm for supporting the foot platform, the support arm having a central portion which connects to the connecting portion of the mounting body, a front arm portion extending substantially forwardly from the central portion and having an end remote from the central portion and an attachment member near the end for receiving and attaching to the foot platform, and a back arm portion extending substantially rearwardly from the central portion and having an end remote from the central portion and an attachment member near the end for receiving and attaching to the foot platform.

3. A bracket as claimed in claim 2 wherein the central portion of the support arm is integral with the connecting portion of the mounting body.

4. A bracket as claimed in claim 2 wherein the front arm portion comprises a first component which extends forwardly from the central portion of the support arm, and a second component substantially transverse to the first component, the attachment member being located on the second component.

5. A bracket as claimed in claim 2 wherein the back arm portion comprises a first component which extends rearwardly from the central portion of the support arm, and a second component substantially transverse to the first component, the attachment member being located on the second component.

6. A bracket as claimed in claim 2 wherein the front arm portion has an axis and the back arm portion has an axis, and the axes of the front arm portion and back arm portion do not overlap.

7. A bracket as claimed in claim 6 wherein the support arm is constructed so that, when mounted on the frame of the motorcycle, the axis of the front arm portion is closer to the frame of the motorcycle than the axis of the back arm portion.

8. A bracket as claimed in claim 2 wherein the attachment members on the front arm portion and back arm portion comprise a series of bolts and corresponding threaded bores, by means of which the foot platform is connected to the attachment members.

9. A bracket as claimed in claim 2 wherein the dimensions of the mounting body and support arm are selected so as to locate the foot platform relative to the frame of the motorcycle in a horizontal and vertical position chosen for the comfort of the rider.

10. A bracket as claimed in claim 9 wherein the front arm portion is longer and the back arm portion is shorter to achieve a horizontal position of the foot platform relative to the motorcycle which is in a more forward position.

11. A bracket as claimed in claim 9 wherein the front arm portion is shorter and the back arm portion is longer to achieve a horizontal position of the foot platform relative to the motorcycle which is in a more rearward position.

12. A bracket as claimed in claim 9 wherein the shape of the mounting body, and the connecting portion thereon, is selected so as to achieve a preferred vertical position of the foot platform.

13. A bracket as claimed in claim 12 wherein the mounting body extends a distance downwardly from the fastening mechanism to provide a lower vertical position of the foot platform relative to the frame of the motorcycle.

14. A bracket as claimed in claim 12 wherein the mounting body extends a distance upwardly from the fastening mechanism to provide a higher vertical position of the foot platform relative to the frame of the motorcycle.

15. A footboard assembly for use with a motorcycle, the footboard assembly comprising:

a bracket comprising a mounting body having a fastening mechanism for fastening the bracket to a frame on/of the motorcycle, and a connecting portion, a support arm for supporting the foot platform, the support arm having a central portion which connects to the connecting portion of the mounting body, a front arm portion extending substantially forwardly from the central portion and having an end remote from the central portion and an attachment member near the end for receiving and attaching to the foot platform, and a back arm portion extending rearwardly from the central portion and having an end remote from the central portion and an attachment member near the end for receiving and attaching to the foot platform; and a foot platform mounted on the bracket at the attachment members on the front arm portion and the back arm portion respectively.

16. A foot board assembly as claimed in claim 15 wherein the foot platform is essentially rectangular in shape having a pair of longer sides and a pair of shorter sides, the foot platform including a pair of attachment structures to coordinate with and connect to each of the attachment members on the front arm portion and rear arm portion respectively.

* * * * *